US009118945B2

(12) United States Patent
Rudman et al.

(10) Patent No.: US 9,118,945 B2
(45) Date of Patent: Aug. 25, 2015

(54) INTERRELATED MULTIPLE SCREEN ADVERTISING

(75) Inventors: Kenneth Alan Rudman, South Pasadena, CA (US); David Anthony Campana, Kirkland, WA (US)

(73) Assignee: Thomson Licensing, Issy les Moulineaux (FR)

( * ) Notice: Subject to any disclaimer, the term of this patent is extended or adjusted under 35 U.S.C. 154(b) by 0 days.

(21) Appl. No.: 14/234,601

(22) PCT Filed: Jul. 29, 2011

(86) PCT No.: PCT/US2011/045821
§ 371 (c)(1),
(2), (4) Date: Jan. 23, 2014

(87) PCT Pub. No.: WO2013/019172
PCT Pub. Date: Feb. 7, 2013

(65) Prior Publication Data
US 2014/0229978 A1    Aug. 14, 2014

(51) Int. Cl.
*H04N 21/254* (2011.01)
*H04N 21/41* (2011.01)
*H04N 21/422* (2011.01)
*H04N 21/454* (2011.01)
*H04N 21/4545* (2011.01)
*H04N 21/462* (2011.01)
*H04N 21/475* (2011.01)
*H04N 21/81* (2011.01)

(52) U.S. Cl.
CPC ......... *H04N 21/254* (2013.01); *H04N 21/2542* (2013.01); *H04N 21/4122* (2013.01); *H04N 21/4126* (2013.01); *H04N 21/42209* (2013.01); *H04N 21/4542* (2013.01); *H04N 21/45455* (2013.01); *H04N 21/4622* (2013.01); *H04N 21/4758* (2013.01); *H04N 21/812* (2013.01)

(58) Field of Classification Search
CPC .................................................... H04N 21/254
USPC ............................................................ 725/32
See application file for complete search history.

(56) References Cited

U.S. PATENT DOCUMENTS 5,724,521 A    3/1998   Dedrick
5,873,068 A    2/1999   Beaumont et al.

(Continued)

FOREIGN PATENT DOCUMENTS

WO    WO0203706    1/2002

OTHER PUBLICATIONS

Ma et al., "IDTV Broadcast Applications for a Handheld Device," 2004 IEEE Int'l. Conference on Communications (ICC 2004), Jun. 20-24, 2004, Paris, FR, vol. 1, pp. 85-89.

(Continued)

*Primary Examiner* — Jefferey Harold
*Assistant Examiner* — Justin Sanders
(74) *Attorney, Agent, or Firm* — Robert D. Shedd

(57) ABSTRACT

In multiple screen environments, an advertising server and a media server can interact with the multiple screens to ensure that advertisements are acknowledged by a viewer. In one example, a main or first screen is obscured to some extent until a viewer acknowledges the advertisement on one or more secondary devices. The extent of obscuring the main screen can be varied as well as the frequency of displaying the advertisement. This allows the user's viewing behavior to be modified based on the method of advertisement placement.

16 Claims, 4 Drawing Sheets

(56) References Cited

U.S. PATENT DOCUMENTS

| | | |
|---|---|---|
| 6,738,978 B1 | 5/2004 | Hendricks et al. |
| 7,130,616 B2 | 10/2006 | Janik |
| 7,389,253 B2 | 6/2008 | Townsend et al. |
| 7,881,702 B2 | 2/2011 | Heyworth et al. |
| 2001/0049661 A1* | 12/2001 | Power et al. .................... 705/51 |
| 2002/0075407 A1* | 6/2002 | Cohen-Solal ................. 348/565 |
| 2004/0005900 A1* | 1/2004 | Zilliacus ....................... 455/466 |
| 2005/0060232 A1 | 3/2005 | Maggio |
| 2010/0153434 A1* | 6/2010 | Erickson et al. .............. 707/769 |

OTHER PUBLICATIONS

Search Report Dated Feb. 21, 2012.

* cited by examiner

INTERRELATED MULTIPLE SCREEN ADVERTISING

This application claims the benefit, under 35 U.S.C. §365 of International Application PCT/US2011/045821, filed Jul. 29, 2011, which was published in accordance with PCT Article 21(2) on Feb. 7, 2013 in English.

BACKGROUND

Previously, viewing experiences were centered around a single device such as a television. When advertisers paid for spots during the viewing time, viewers were forced to watch the advertisements. The only sure method of not viewing the advertisements was to switch channels or turn the viewing device off. With the introduction of multiple viewing devices, the viewers now can easily divert their attention to one or more other viewing devices during the advertisement. This makes the advertisement less impactful and degrades its value to the advertiser.

SUMMARY

A user using more than one screen is forced to consider advertisements that shift between the screens. For example, a system and user interface is provided in which a user can utilize both a main screen and a second screen at the same time. The main screen in this case is typically used for watching broadcast television. The second screen can also be used for watching television but is also used for getting information and other media services that are related to what a user is currently watching on the main screen. A user must acknowledge an advertisement displayed on the main screen via the second screen in order for the main screen viewing to not be obscured, forcing the viewer to witness the advertisement.

The above presents a simplified summary of the subject matter in order to provide a basic understanding of some aspects of subject matter embodiments. This summary is not an extensive overview of the subject matter. It is not intended to identify key/critical elements of the embodiments or to delineate the scope of the subject matter. Its sole purpose is to present some concepts of the subject matter in a simplified form as a prelude to the more detailed description that is presented later.

To the accomplishment of the foregoing and related ends, certain illustrative aspects of embodiments are described herein in connection with the following description and the annexed drawings. These aspects are indicative, however, of but a few of the various ways in which the principles of the subject matter can be employed, and the subject matter is intended to include all such aspects and their equivalents. Other advantages and novel features of the subject matter can become apparent from the following detailed description when considered in conjunction with the drawings.

DETAILED DESCRIPTION

Figure 1:
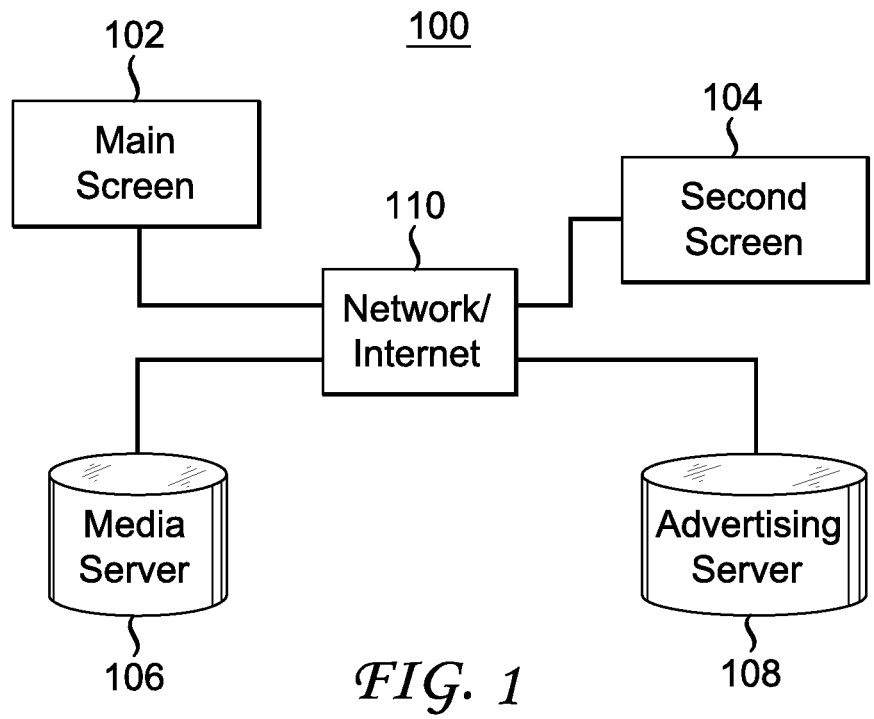
FIG. 1 is an example system for a type of delivery mechanism.

The subject matter is now described with reference to the drawings, wherein like reference numerals are used to refer to like elements throughout. In the following description, for purposes of explanation, numerous specific details are set forth in order to provide a thorough understanding of the subject matter. It can be evident, however, that subject matter embodiments can be practiced without these specific details. In other instances, well-known structures and devices are shown in block diagram form in order to facilitate describing the embodiments.

For viewing systems that utilize multiple viewing devices, viewers can be coerced into acknowledging an advertisement on a viewing device while their attention is with another viewing device. This substantially increases the value of the advertisement. A system and user interface in which a user can utilize both a main screen and a second screen at the same time is used as a simple example, but it can be utilized with any number of viewing devices. The main screen in this case is typically used for watching broadcast television or other video services such as movies, sports events, and the like. The second screen can also be used for watching television and video services and the like but it can also be used for getting information and other media services that are related to what a user is currently watching on the main screen. For purposes of the discussion below, the main screen can be a device such as a television set and the second screen can be something such as a touch screen or portable device such as a cellular phone, an Apple brand Ipad, Android based touch tablet, and the like.

For example, if one were watching sports programming on the main screen, a user can use the second screen to view various statistics and player information about the game Likewise for a movie that is being watched on the main screen, a user can use the second screen to get information about the actors, the movie director, the genre of the movie, and other trivia about the movie. In another example of what can be done between both devices is that the party can use the main screen to watch a video, and they can use the secondary screen, at the same time, to view websites or to use other information sources that are available through the Internet. A big issue with advertisers is—to consider within the example of using multiple screens —is how to present advertisements such as banner ads.

A simple example has advertisements only displayed on either the main screen or the secondary screen. In this example, advertisements can stay on a device (out of the two devices) all of the time. Hence, a main screen can always show advertisements while the second screen can be used for displaying information such as statistics and player information. Or, the main screen is used for presenting sports game while the secondary screen is used for displaying advertisements.

This simple model allows for a user to avoid looking at an ad by ignoring the device that displays such an advertisement. This of course is very easy to do if the device that is showing the ad is the secondary screen. This approach of avoidance becomes harder if the user ignores the main screen, if such a device is used for displaying ads. Although the user can probably watch videos on the secondary screen instead, such an approach is cumbersome and not desirable.

A system and/or method is now provided that adjusts the display of ads between both devices where an advertisement can shift between both the main screen and the secondary device (or devices) based on a user's interaction with both devices. In addition, other examples incorporate the use of a media server which contains a video which can be seen on both devices and/or an advertising server which is used to deliver ads to both devices. For the purposes of this example, it is going to be assumed that the ads and the video content can be of a commonly used video format such as H.264, Quicktime, MPEG-2, VC-1, Flash, HTML5, MPEG-4, SVC, and the like. Also for the purposes of this example, advertisements can advertisements that can consist of flash animations or static images such as PNG, JPEG, BMP, and the like.

With the presentation of content, a media server 106 can stream video content to a main screen 102 and to one or more secondary screens 104 via a communication means 110. An advertising server 108 likewise can also transmit advertisements to the main screen 102 and the one or more secondary devices 104 in the form of videos, flash animations, and/or static images such as banner ads. An example 100 of this type of delivery mechanism is shown in FIG. 1.

Figure 2:
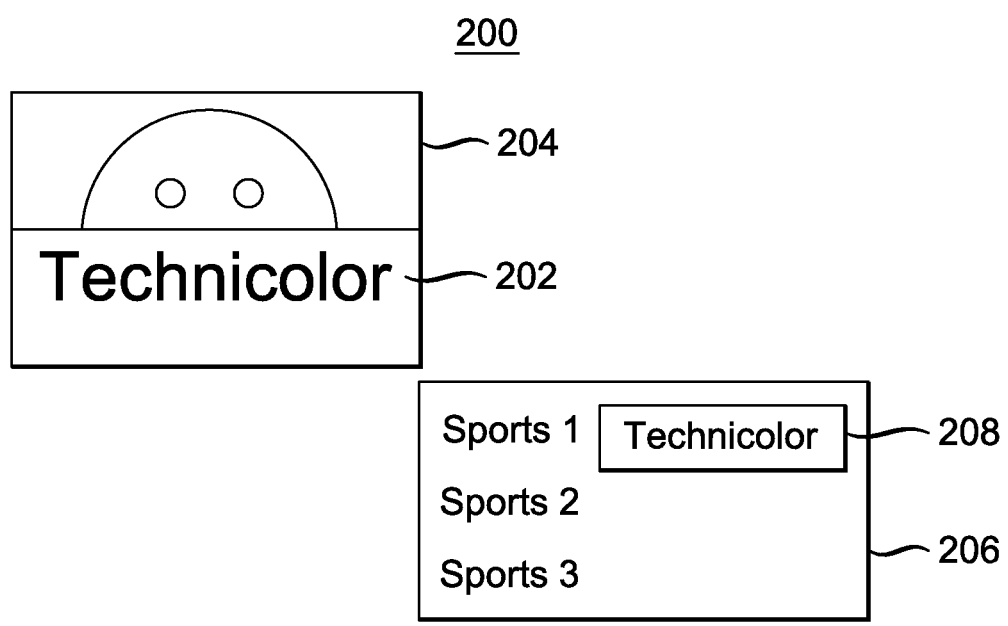
FIG. 2 of the invention shows a banner ad on the main screen and shows a sample version of the banner ad on the secondary screen.
Figure 3:
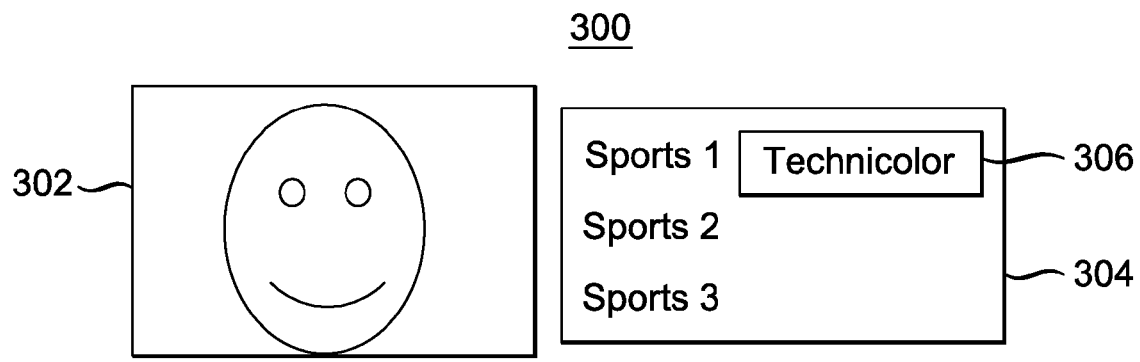
FIG. 3 is a basic example where a user will not see ads on the main screen as long as they interact with the ads on the secondary screen.

FIG. 2 shows a banner ad 202 on a main screen 204 and shows a sample version of the banner ad 208 on a secondary screen 206. A user can eliminate the display of the banner ad 202 from the first screen 204 by interfacing with the banner ad 208 on the second screen 206. This yields a banner free first or main screen 302 as shown in FIG. 3. This particular embodiment provides that the more that the user interacts with the ad on the second screen, the more likely that the banner ad will not be shown on the main screen. Hence a user is able to watch video programming on the main screen unobstructed as long as the user is watching an ad on the second screen.

This aspect can further be refined if a user has a home environment where a network recognizes the presence of various devices. For example one can have DLNA network recognize whether a main screen, such as a television, is present in the home. The Digital Living Network Alliance (DLNA) network can also recognize whether or not a user has a secondary device to watch programming Using this information, a network operator can deliver ads to one device if only one device is present in the home. The network operator can also offer the user an option where it both devices are in the home, advertisements can only be shown on the second screen and never interrupt the main programming provided that the user interacts with the secondary screen.

In the basic example 300 provided in FIG. 3, a user will not see ads on the main screen 302 as long as they interact with the ads 306 on the secondary screen 304. Based upon whatever timing criteria the network operator wants to use, if the user stops interacting with the secondary screen 304, the main screen 302 can start showing ads. These ads can be adjusted based upon a predetermined time or other criteria. For example a network operator can require that a user interacts with a secondary screen for three minutes for every hour viewed on the main screen. If the user does not interact with the ad on the secondary screen, the advertisement begins to shift from the second screen to the main screen in a variety of ways.

Figure 4:
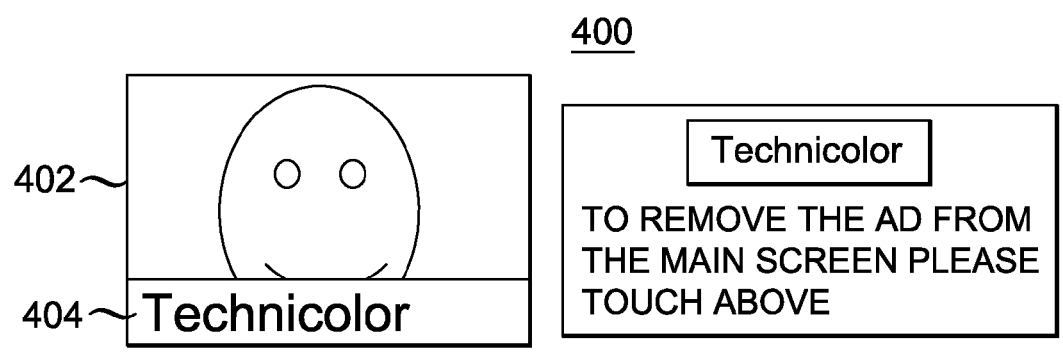
FIG. 4 presents a situation after a predetermined period expires.
Figure 5:
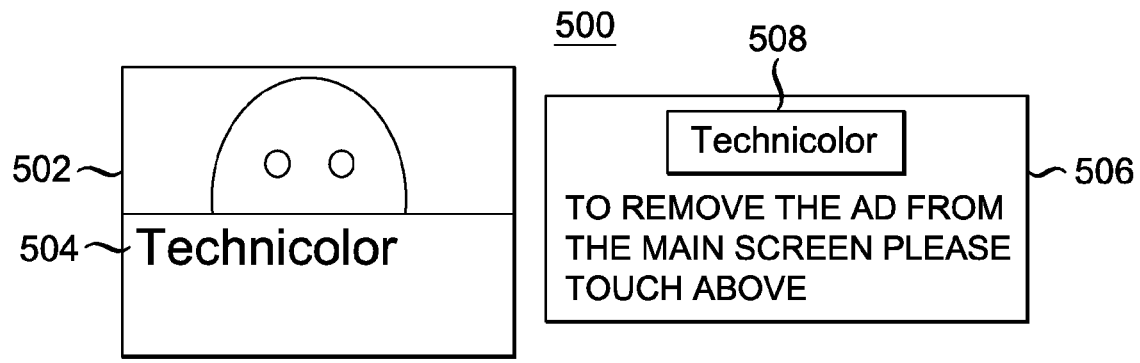
FIG. 5 shows what happens when more time lapses.

FIG. 4 presents a situation 400 after a predetermined period expires; a small version of an advertisement 404 begins to be shown on a main screen 402 which partially obscures the main viewing area. FIG. 5 is an example 500 of what happens when more time lapses and where an advertisement 504 now takes even more space on a main screen 502 because more time has elapsed between the user's operations of a secondary screen 506 to view an advertisement 508. Once a user interacts with the secondary screen 506, the presentation 300 of FIG. 3 is displayed again.

The types of advertisements viewed can impact the amount of time a main screen can be free of ads. For example, the viewing of a car commercial can result in the main screen being used for two hours without interruption. Likewise the viewing of an advertisement for a movie trailer on the second device can provide an hour of unobstructed viewing on the main screen. Ideally, a network operator can vary such ads based on the amount of money they receive from various advertisers.

Figure 6:
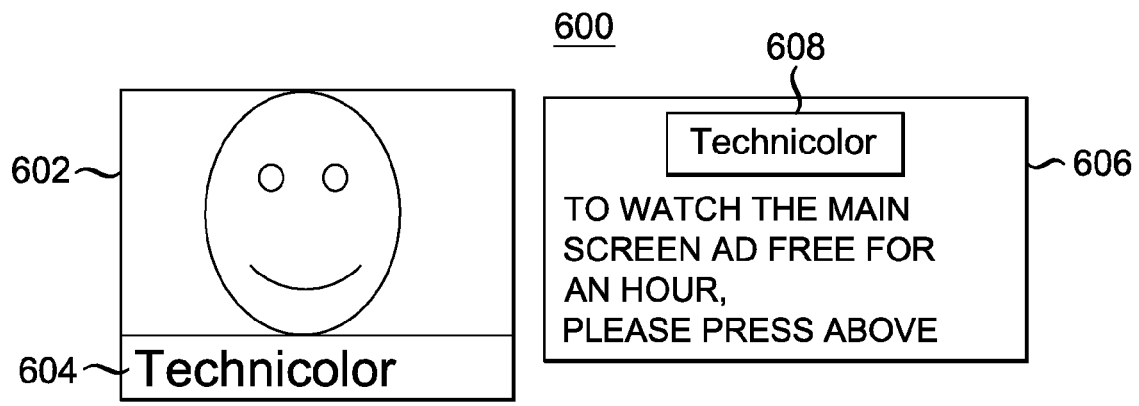
FIG. 6 presents an alternative way to view content on the main screen unobstructed.

FIG. 6 presents an alternative way 600 of viewing content on a main screen 602 unobstructed. At a certain point in the viewing experience, a user can be presented with an advertisement 604 on the main screen 602 that states that an ad is available for viewing. If the user views such an ad on the first screen 602, the amount of time in which the main screen 602 can be ad free is for two hours (for example). If the ad 608 is viewed on a second screen 606, the time the main screen 602 can be ad free is one hour. Hence, the system provides a user multiple ways to watch ads. Likewise, an ad viewed on a mobile phone (not shown) can provide ad free viewing on the main screen 602 for a half an hour. This example can be modified where a user can earn credits to get programming or other inducements in exchange for watching advertisements on the secondary device.

Figure 7:
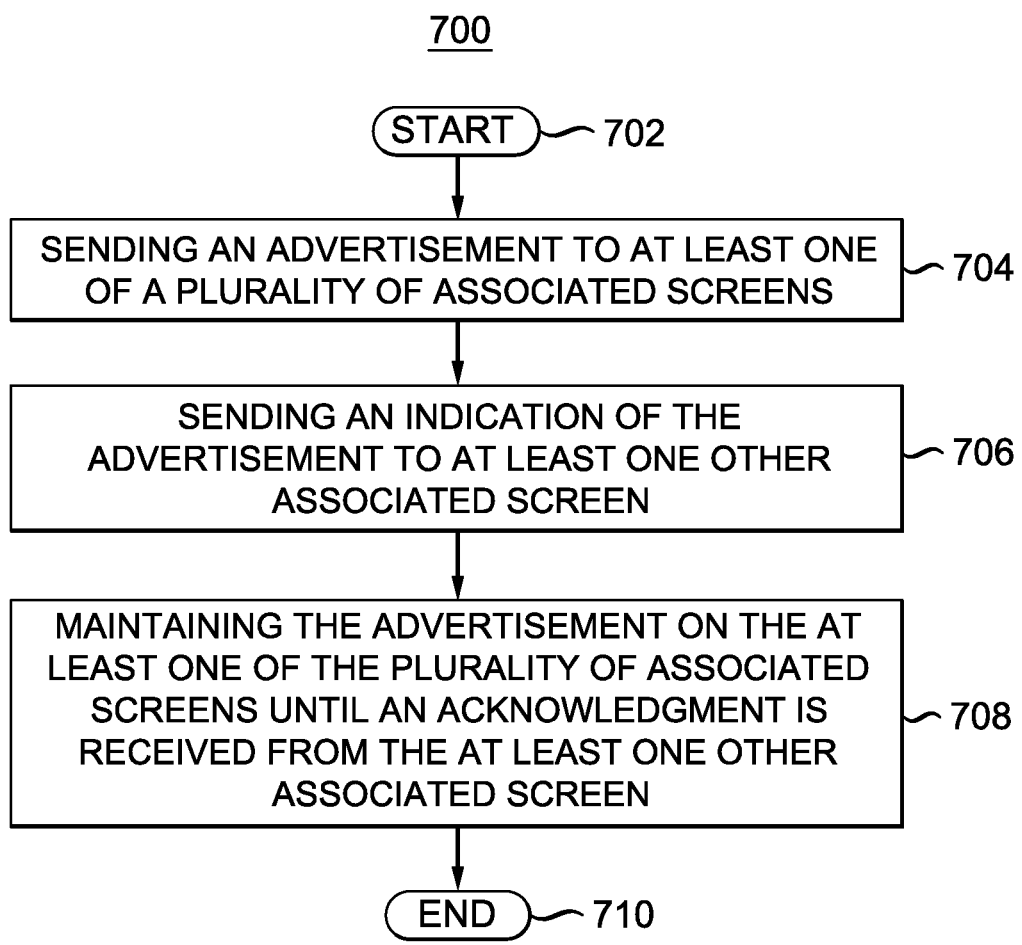
FIG. 7 is a flow diagram of a method of placing advertising on multiple screens

In view of the exemplary systems shown and described above, methodologies that can be implemented in accordance with the embodiments will be better appreciated with reference to the flow charts of FIG. 7. While, for purposes of simplicity of explanation, the methodologies are shown and described as a series of blocks, it is to be understood and appreciated that the embodiments are not limited by the order of the blocks, as some blocks can, in accordance with an embodiment, occur in different orders and/or concurrently with other blocks from that shown and described herein. Moreover, not all illustrated blocks may be required to implement the methodologies in accordance with the embodiments.

FIG. 7 is a flow diagram of a method 700 of placing advertising on multiple screens. The method starts 702 by sending an advertisement to at least one of a plurality of associated screens 704. The screens are associated in any manner that ties information and/or content viewing from one screen to another. An indication of the advertisement is then sent to at least one other associated screen 706. The indication can be, but is not limited to, a thumbnail or sample sizing of the advertisement placed on the one of a plurality of associated screens. The advertisement is then maintained on the at least one of the plurality of associated screens until an acknowledgment is received from the at least one other associated screen 708, ending the flow 710. The acknowledgment can include, but is not limited to, clicking on the indication, watching an advertisement and/or some other form of acknowledgment.

In an alternative embodiment, at least a portion of the at least one of the plurality of associated screens is obscured until the acknowledgment is received. The obscuring can be done opaquely and/or transparently over viewed content. In another embodiment, a time duration since an acknowledgment was last received from the at least one other associated screen can be calculated and the obscured portion of the at least one of the plurality of associated screens is then increased based on the time duration since last acknowledgment. In essence, the viewed content is slowly blocked as an incentive to motivate the viewer to quickly acknowledge the advertisement. The advertisement can be removed from the at least one of the plurality of associated screens for a time duration based on a user's interaction with an advertisement. The user's interaction can include, but is not limited to, an acknowledgment of the advertisement, a viewing of the advertisement on the at least one other associated screen and a viewing of the advertisement on the at least one of the plurality of associated screens. This can retard the advertisement frequency based on the quality of the acknowledgment from the user.

What has been described above includes examples of the embodiments. It is, of course, not possible to describe every conceivable combination of components or methodologies for purposes of describing the embodiments, but one of ordinary skill in the art can recognize that many further combinations and permutations of the embodiments are possible. Accordingly, the subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

The invention claimed is:

1. A system that places advertisements, comprising:
   a media server that provides viewing content and interacts with a plurality of viewing devices, the plurality of viewing devices comprising at least a first screen and a second screen; and
   an advertising server that interacts with the media server and with the first screen and the second screen to place advertisements on the first screen and second screen, the advertisements maintained on the first screen until an acknowledgment is received from the second screen.

2. The system of claim 1, wherein the advertisement obscures at least a portion of the first screen until the acknowledgment is received from the second screen.

3. The system of claim 2, wherein the media server calculates a time duration since the acknowledgment was last received from the second screen and increases the obscured portion of the first screen based on the time duration since last acknowledgment.

4. The system of claim 1, wherein the media server removes the advertisement from the first screen for a length of time based on a user's interaction with an advertisement.

5. The system of claim 4, wherein the user's interaction includes one of an acknowledgment of the advertisement, a viewing of the advertisement on at least one other associated screen and a viewing of the advertisement on the at least one of a plurality of associated screens.

6. A method for placing advertisements, comprising:
   sending an advertisement to at least one of a plurality of associated screens;
   sending an indication of the advertisement to at least one other associated screen; and
   maintaining the advertisement on the at least one of the plurality of associated screens until an acknowledgment is received from the at least one other associated screen.

7. The method of claim 6 further comprising:
   obscuring at least a portion of the at least one of the plurality of associated screens until the acknowledgment is received.

8. The method of claim 7 further comprising:
   calculating a time duration since an acknowledgment was last received from the at least one other associated screen; and
   increasing the obscured portion of the at least one of the plurality of associated screens based on the time duration since last acknowledgment.

9. The method of claim 6 further comprising:
   removing the advertisement from the at least one of the plurality of associated screens for a time duration based on a user's interaction with an advertisement.

10. The method of claim 9, wherein the user's interaction includes one of an acknowledgment of the advertisement, a viewing of the advertisement on the at least one other associated screen and a viewing of the advertisement on the at least one of the plurality of associated screens.

11. A system that places advertisements in a multi-screen environment, comprising:
    means for sending an advertisement to at least a first screen of a plurality of associated screens;
    means for sending an indication of the advertisement to at least a second screen of the plurality of associated screens; and
    means for maintaining the advertisement on the first screen until an acknowledgment is received from the second screen.

12. The system of claim 11 further comprising:
    means for obscuring at least a portion of the first screen;
    means for calculating a time duration since an acknowledgment was last received from the second screen; and
    means for increasing the obscured portion of the first screen based on the time duration since last acknowledgment.

13. A device comprising:
    a screen; and
    at least one processor configured to:
       render an advertisement on the screen;
       transmit an indication to at least one remote device that the advertisement is displayed on the screen;
       remove the advertisement from the screen, when an acknowledgment is detected from the remote device; and
       restore the advertisement on the screen, when a time duration since the acknowledgment was detected exceeds a threshold.

14. A method comprising:
    rendering, by a first device, an advertisement on a screen;
    transmitting, by the first device, an indication to a second device that the advertisement is displayed on the screen;
    removing, by the first device, the advertisement from the screen, when an acknowledgment is detected from the second device; and
    restoring, by the first device, the advertisement on the screen, when a time duration since the acknowledgment was detected exceeds a threshold.

15. a device comprising:
    a screen; and
    at least one processor configured to:
       detect an indication that an advertisement is being displayed by a remote device;
       render a different version of the advertisement on the screen, in response to the indication; and
       transmit an acknowledgment to the remote device, when an interaction with the different version of the advertisement is detected.

16. A method comprising:
    detecting, using a first device, an indication that an advertisement is being displayed by a second device;

rendering, by the first device, a different version of the advertisement on a screen, in response to the indication; and transmitting, by the first device, an acknowledgment to the second device, when an interaction with the different version of the advertisement is detected.

\* \* \* \* \*